US012398603B2

(12) United States Patent
Albeshri et al.

(10) Patent No.: US 12,398,603 B2
(45) Date of Patent: Aug. 26, 2025

(54) SLICKLINE LUBRICATION DEVICES, SYSTEMS, AND METHODS FOR USING THE SAME

(71) Applicant: Saudi Arabian Oil Company, Dhahran (SA)

(72) Inventors: Raissan F. Albeshri, Safwa (SA); Hussain S. Hunidi, Qatif (SA); Ayman A. Qatari, Juaymah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/402,855

(22) Filed: Jan. 3, 2024

(65) Prior Publication Data

US 2025/0215757 A1 Jul. 3, 2025

(51) Int. Cl.

| | |
|---|---|
| ***E21B 19/00*** | (2006.01) |
| ***B66D 1/28*** | (2006.01) |
| ***E21B 33/06*** | (2006.01) |
| ***E21B 33/072*** | (2006.01) |
| ***E21B 33/08*** | (2006.01) |

(52) U.S. Cl.

CPC .............. *E21B 19/008* (2013.01); *B66D 1/28* (2013.01); *E21B 33/072* (2013.01); *E21B 33/06* (2013.01); *E21B 33/08* (2013.01)

(58) Field of Classification Search

CPC ........ E21B 33/08; E21B 33/06; E21B 33/072; E21B 19/008; B66D 1/28; B66D 1/00; B08B 3/041

See application file for complete search history.

(56) References Cited

U.S. PATENT DOCUMENTS 2,628,112 A * 2/1953 Hebard .................. F16J 15/187 277/516
3,013,825 A * 12/1961 Wilson .................... E21B 33/08 277/330
3,129,009 A 4/1964 Simpson
3,415,317 A * 12/1968 Drivet ....................... E21B 7/12 166/336
3,468,549 A * 9/1969 Wilson .................... E21B 33/08 277/330
4,336,866 A * 6/1982 Blanton, Jr. .............. F16N 7/00 118/DIG. 18
4,480,842 A * 11/1984 Mahyera ................ F16J 15/187 277/516
4,498,558 A * 2/1985 Bendahan ................ D07B 7/12 277/543
4,579,350 A * 4/1986 Knox ....................... F16J 15/56 277/928

(Continued)

*Primary Examiner* — George S Gray
(74) *Attorney, Agent, or Firm* — DINSMSORE & SHOHL LLP

(57) ABSTRACT

A slickline lubrication device may comprise a contaminant housing sized to accept a slickline cable; a solvent housing sized to accept the slickline cable, the solvent housing coupled to the contaminant housing; a first plate sized to accept the slickline cable, the first plate positioned proximal the contaminant housing coupling end or the solvent housing coupling end; a first sealing element sized to accept the slickline cable, wherein the first sealing element is positioned within the contaminant housing, the plate, or both; and a second sealing element sized to accept the slickline cable, wherein the second sealing element is positioned within the solvent housing.

25 Claims, 5 Drawing Sheets

(56) References Cited

U.S. PATENT DOCUMENTS

| | | | | |
|---|---|---|---|---|
| 4,613,349 | A * | 9/1986 | Drapp | B04C 5/02 55/458 |
| 4,647,050 | A * | 3/1987 | Johnson | E21B 33/08 277/516 |
| 2003/0127220 | A1* | 7/2003 | Farquharson | F04B 53/164 166/87.1 |
| 2011/0009017 | A1 | 1/2011 | Winiski et al. | |

* cited by examiner

SLICKLINE LUBRICATION DEVICES, SYSTEMS, AND METHODS FOR USING THE SAME

TECHNICAL FIELD

Embodiments of the present disclosure generally relate to devices, systems, and methods for cable lubrication and maintenance, and particularly to devices, systems, and methods for slickline cable lubrication.

BACKGROUND

In the oil and gas industry, tools suspended by slickline wire/cable are used to perform a variety of tasks within a wellbore, including retrieving tools and equipment, setting plugs, and collecting downhole measurements including pressure, temperature, pH, etc. In these situations, the slickline cable is subjected to a variety of harsh conditions in the wellbore, including but not limited to high temperatures and physical wear by tensioning of the cable. Further, both inside and outside the wellbore, contaminants such as wellbore fluids (caustic and acidic), dirt, and grime may collect on the cable. All of these conditions may damage or otherwise shorten the useable lifespan of the slickline cable.

SUMMARY

Accordingly, desired are devices, systems, and methods of preserving slickline cable such that its lifespan may be extended. One such method of preserving the slickline cable may be cleaning and lubrication, such as by coating the slickline cable in a lubricant prior to entry into the wellbore. However, the application of the lubricant may still not resolve the problem of the contaminants coating/damaging the slickline cable when inserted into or retrieved from the wellbore. Accordingly, devices, systems, and methods are also desired to remove the wellbore fluids and contaminants from the slickline cable.

Consequently, described herein are devices, systems, and methods that fulfill the aforementioned needs. Particularly, a slickline lubrication device may comprise a solvent housing and a contaminant housing arranged around a slickline cable. The solvent housing may be arranged to receive the slickline cable from a slickline cable spool when the slickline cable is inserted into the wellhead, and subsequently expose a lubricating solvent to the slickline cable during the same.

The contaminant housing may be arranged to receive the slickline cable from the wellhead when the slickline cable is retrieved from the wellhead, and subsequently remove the contaminants through one or more sealing elements that wipe an exterior of the slickline cable. Similarly, the solvent housing may comprise one or more sealing elements that remove excess lubricant from the slickline cable when the slickline cable is retrieved from the wellhead. The solvent housing and contaminant housing may also be coupled, such that the lubrication and removal of the contaminants may occur in a single housing. The sealing elements may also contribute to an isolation of the solvent housing from the contaminant housing, such that contaminants do not mix with the solvent when the two housings are coupled.

In accordance with one embodiment of the present disclosure, a slickline lubrication device may comprise a contaminant housing comprising a solvent housing coupling end, a first end, and at least one contaminant housing sidewall extending from the solvent housing coupling end to the first end, wherein the first end comprises a first end opening sized to accept a slickline cable; a solvent housing comprising a second end, a contaminant housing coupling end, and at least one solvent housing sidewall extending from the second end to the contaminant housing coupling end, wherein the second end comprises a second end opening sized to accept the slickline cable, and wherein the solvent housing is coupled to the contaminant housing; a first plate comprising a first plate opening sized to accept the slickline cable, the first plate positioned proximal the contaminant housing coupling end or the solvent housing coupling end; a first sealing element comprising a first sealing element opening that is sized to accept the slickline cable, wherein the first sealing element is positioned within the contaminant housing, the plate, or both; and a second sealing element comprising a second sealing element opening that is sized to accept the slickline cable, wherein the second sealing element is positioned within the solvent housing.

In accordance with another embodiment of the present disclosure, a system for slickline lubrication may comprise a pressure control apparatus fluidly coupled to a well casing; a lubricator positioned above and fluidly connected to the BOP; a stuffing box positioned above and fluidly connected to the lubricator; a stuffing box sheave positioned above the stuffing box; a slickline lubrication device, the slickline lubrication device positioned below the stuffing box sheave and offset from the lubricator; a joint removably coupling the stuffing box, the lubricator, or both to the slickline lubrication device; a hay pulley positioned below the slickline lubrication device; and a slickline cable extending along the hay pulley and the stuffing box sheave, and extending within the slickline lubrication device, the stuffing box, and the lubricator.

In the previous embodiment, the slickline lubrication device may comprise a contaminant housing comprising a solvent housing coupling end, a first end, and at least one contaminant housing sidewall extending from the solvent housing coupling end to the first end, wherein the first end comprises a first end opening sized to accept a slickline cable; a solvent housing comprising a second end, a contaminant housing coupling end, and at least one solvent housing sidewall extending from the second end to the contaminant housing coupling end, wherein the second end comprises a second end opening sized to accept the slickline cable, and wherein the solvent housing is coupled to the contaminant housing; a first plate comprising a first plate opening sized to accept the slickline cable, the first plate positioned proximal the contaminant housing coupling end or the solvent housing coupling end; a first sealing element comprising a first sealing element opening that is sized to accept the slickline cable, wherein the first sealing element is positioned within the contaminant housing, the plate, or both; and a second sealing element comprising a second sealing element opening that is sized to accept the slickline cable, wherein the second sealing element is positioned within the solvent housing.

In accordance with yet another embodiment of the present disclosure, a method of conducting slickline operations may comprise providing a system for slickline lubrication; feeding the slickline cable through the slickline lubrication device, thereby exposing an exterior of the slickline cable to solvent in the solvent chamber; feeding the slickline cable through the wellbore, thereby exposing an exterior of the slickline cable to wellbore fluids; and retrieving the slickline cable from the wellbore, thereby removing the wellbore fluids from an exterior of the slickline cable utilizing the first sealing element and subsequently exposing the slickline cable to the solvent in the solvent housing.

In the previous embodiment, the system for slickline lubrication may comprise a pressure control apparatus fluidly coupled to a well casing; a lubricator positioned above and fluidly connected to the BOP; a stuffing box positioned above and fluidly connected to the lubricator; a stuffing box sheave positioned above the stuffing box; a slickline lubrication device, the slickline lubrication device positioned below the stuffing box sheave and offset from the lubricator; a joint removably coupling the stuffing box, the lubricator, or both to the slickline lubrication device; a hay pulley positioned below the slickline lubrication device; and a slickline cable extending along the hay pulley and the stuffing box sheave, and extending within the slickline lubrication device, the stuffing box, and the lubricator.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

As previously stated, embodiments herein generally relate to devices, systems, and methods for cable lubrication and maintenance, and particularly to devices, systems, and methods for slickline cable lubrication and slickline operations utilizing the same.

As used herein, the term "distal" means farther away from another component, such as at the opposite end from that component which the second component is distal from. Similarly, the term "proximal" means nearer to, such as at the same end of that component which the second component is proximal to. For example, as used herein, a first plate being proximal to a solvent housing coupling end means the first plate is nearby, adjacent to, or aligned with the solvent housing coupling end. Similarly, a first plate being distal to the solvent housing coupling end means the first plate is farther away from (with respect to proximal) or opposite of the solvent housing coupling end.

Figure 1:
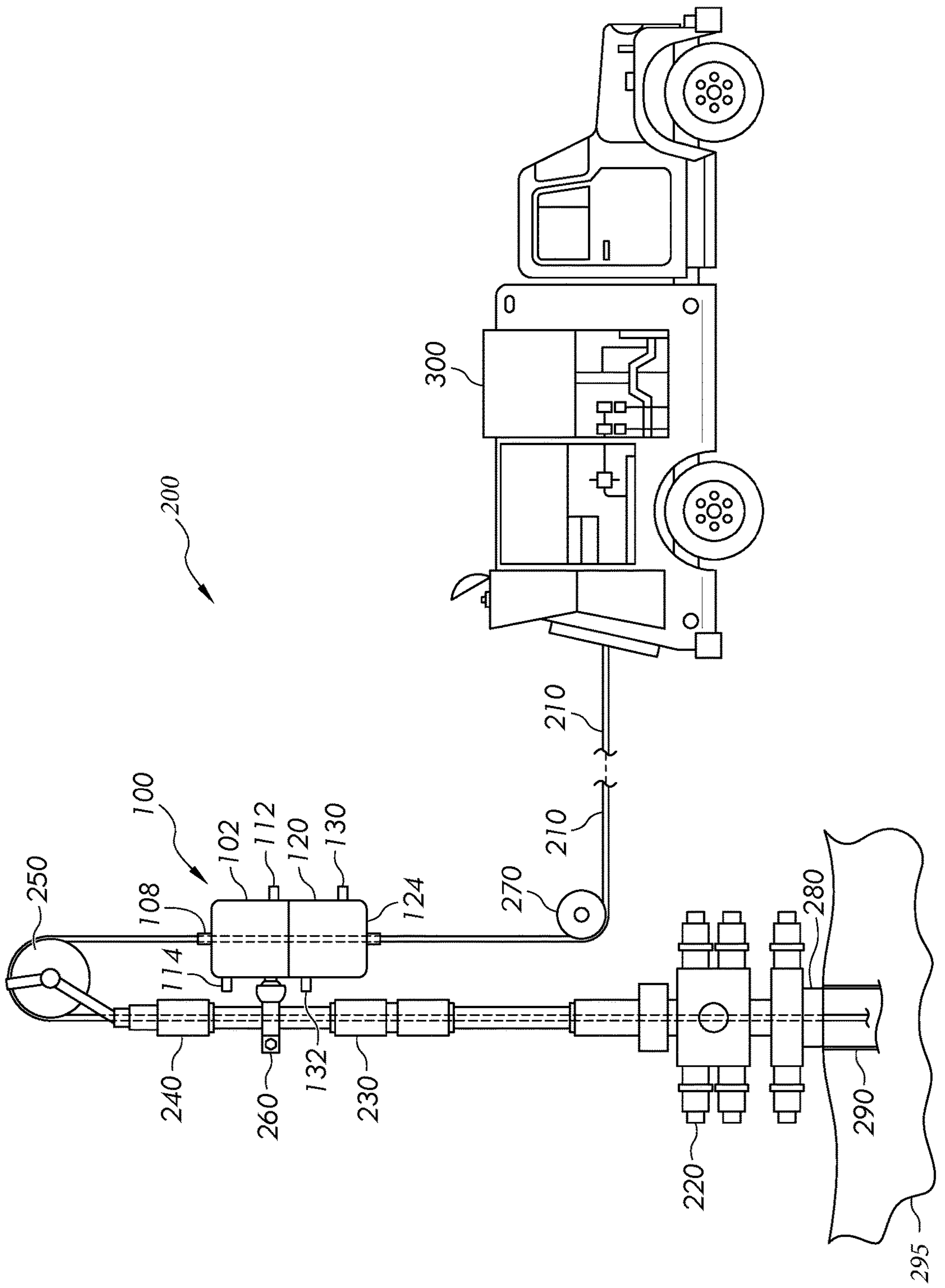
FIG. 1 illustrates a perspective or elevational view of a system for slickline lubrication, including a slickline lubrication device, according to one or more embodiments herein.

Referring initially to FIG. 1, a system 200 for slickline lubrication is illustrated. As shown in FIG. 1, the system 200 may comprise a slickline lubrication device 100, a slickline cable 210, a pressure control device 220, a lubricator 230, a stuffing box 240, a stuffing box sheave 250, a joint 260, a hay pulley 270, a wellhead 280, a wellbore 290, a subsurface formation 295, a slickline spool/truck 300, or combinations thereof.

As also shown in FIG. 1, the wellbore 290 may be fluidly connected to the subsurface formation 295. The wellbore 290 may be fluidly coupled to the wellhead 280. The pressure control device 220 may be positioned above and fluidly connected to the wellhead 280. The pressure control device 220 may be a blow-out preventer (BOP), a Christmas tree, or any other pressure control device known in the art. As used herein, a "Christmas tree" refers to an assembly of valves, casing spools, and fittings used to regulate flow into or out of a wellbore 290.

The lubricator 230 may be positioned above and fluidly connected to the pressure control device 220. The stuffing box 240 may be positioned above and fluidly connected to the lubricator 230. The stuffing box sheave 250 may be positioned above the stuffing box 240. The slickline lubrication device 100 may be positioned below the stuffing box sheave 250, and may be offset from the stuffing box 240. The slickline lubrication device 100 may be removably coupled to the joint 260, which may be a ball-joint 260. The joint 260 may in turn be removably coupled to the stuffing box 240, the lubricator 230, or both. The hay pulley 270 may be positioned below the slickline lubrication device 100. The hay pulley 270 may be coupled to the lubricator 230 or an anchor point (not illustrated) as may be understood in the art.

Still referring to FIG. 1, the slickline cable 210 may extend within the slickline lubrication device 100, the stuffing box 240, the lubricator 230, the pressure control device 220, the wellhead 280, the wellbore 290, or combinations thereof. The slickline cable 210 may be spooled in a slickline spool, which may be housed in a slickline truck 300, as may be understood in the art. The slickline cable 210 may also be fed through open loop conveyance or closed loop conveyance, as may be understood in the art. While not shown in FIG. 1, the slickline cable 210 may be coupled to any wellbore 290 testing and intervention tool known in the art, including but not limited to a fishing tool, a sensor array, a plug, or combinations thereof. The slickline cable 210 may have an outer diameter of from 0.05 inches to 0.2 inches, such as from 0.05 inches to 0.1 inches, from 0.1 inches to 0.15 inches, from 0.15 inches to 0.2 inches, or combinations of the previous ranges or smaller ranges therein.

Figure 2:
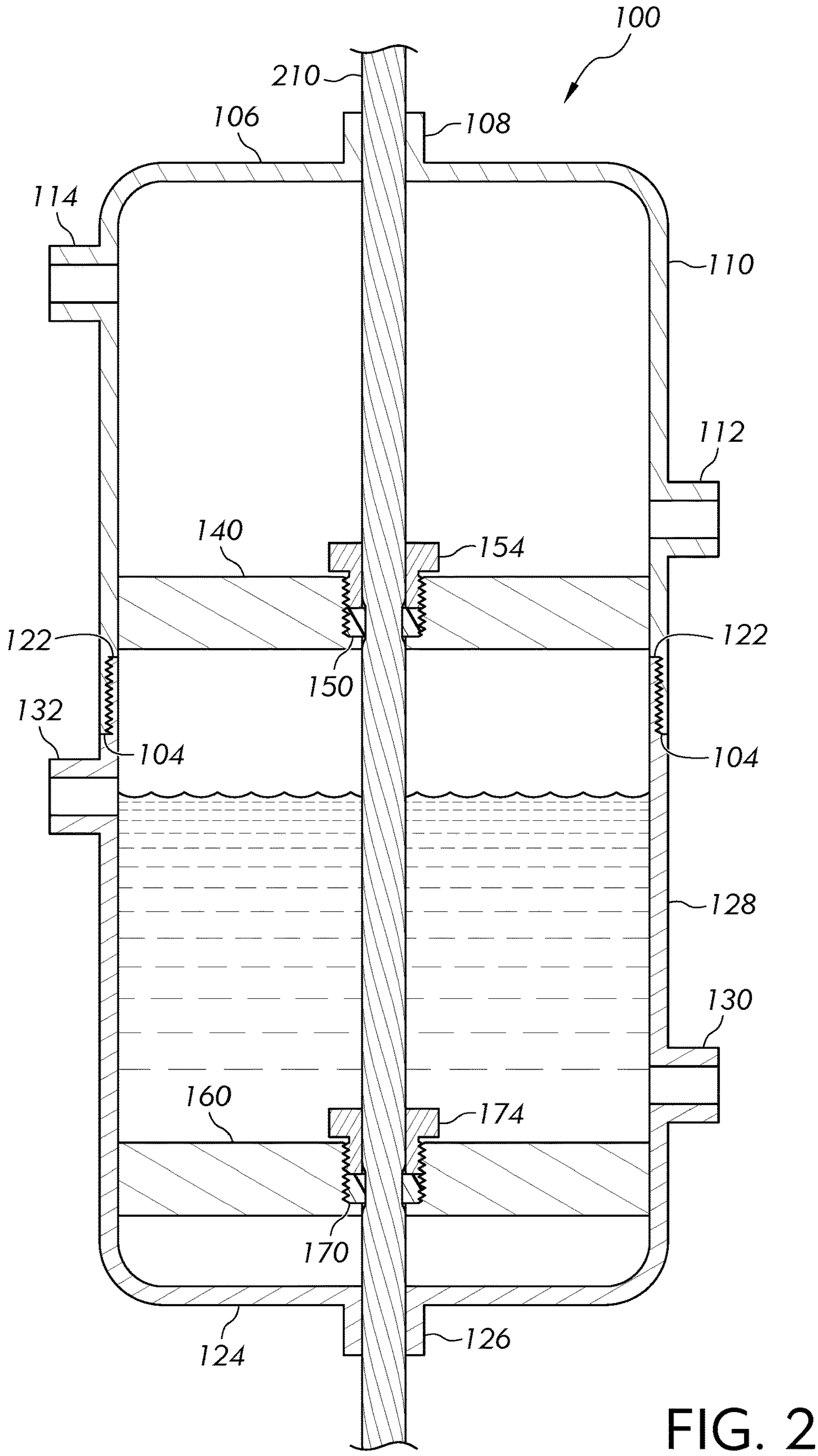
FIG. 2 illustrates a cross-sectional view of the slickline lubrication device of FIG. 1, according to one or more embodiments herein.
Figure 3:
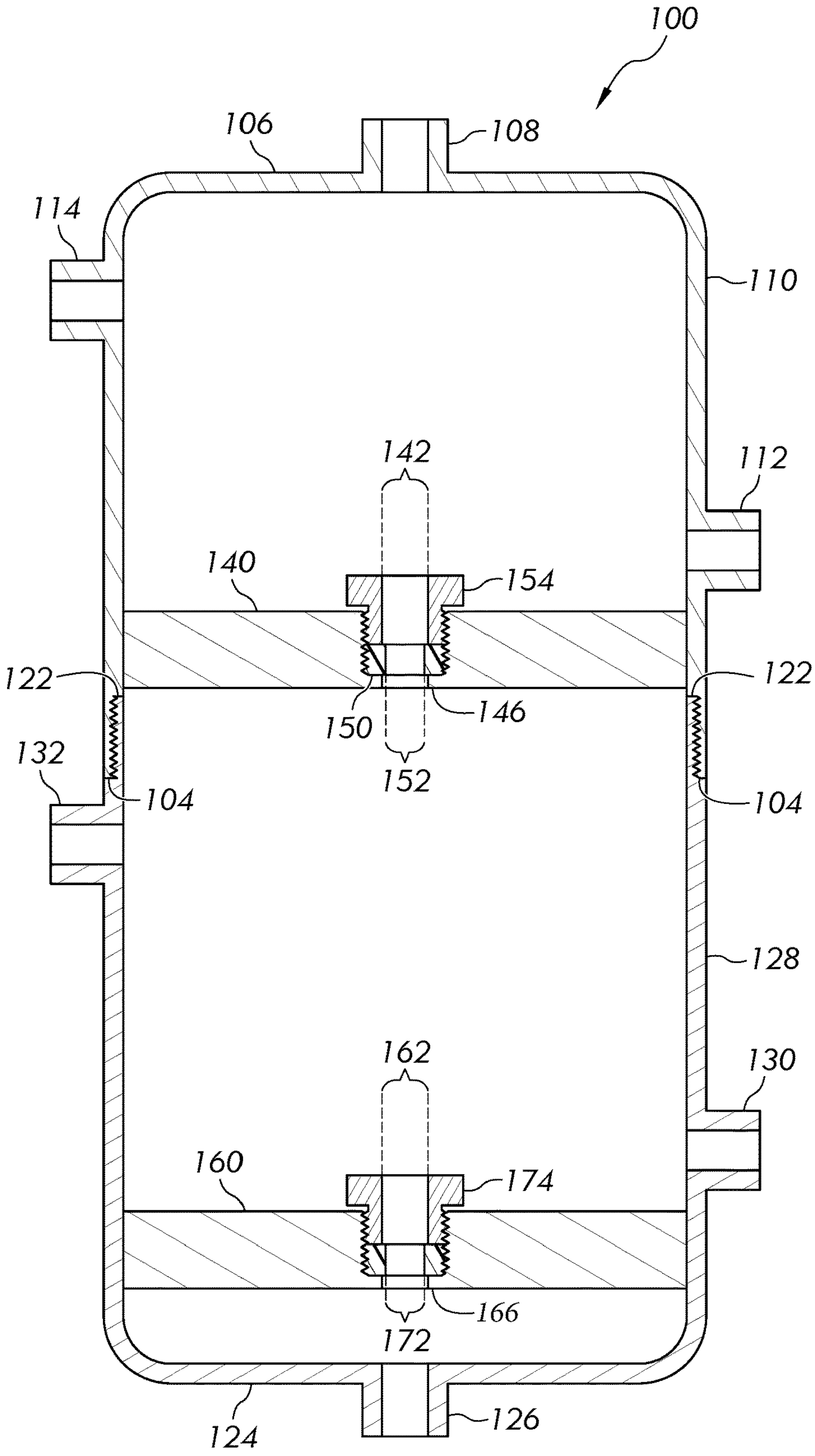
FIG. 3 illustrates a cross-sectional view of the slickline lubrication device of FIGS. 1-2, according to one or more embodiments herein, but without illustrating the slickline cable.
Figure 4:
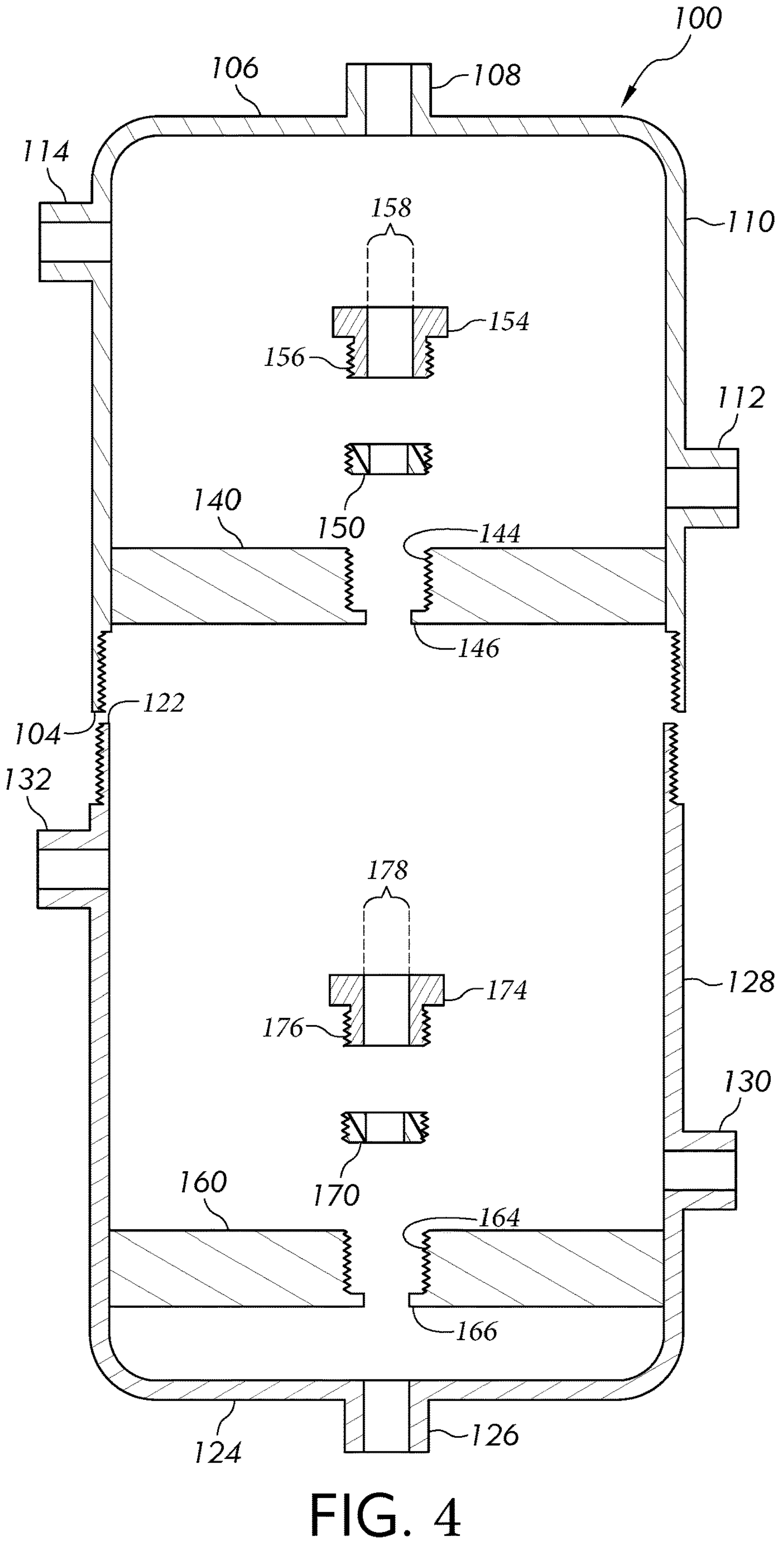
FIG. 4 illustrates a cross-sectional exploded view of the slickline lubrication device of FIG. 3, according to one or more embodiments herein.

Now referring to FIGS. 2-4, illustrated is a cross-sectional view of the slickline lubrication device 100 with the slickline cable 210 (FIG. 2) and without the slickline cable 210 (FIGS. 3-4). The slickline lubrication device 100 may be compatible with any of the systems 200 previously discussed. As shown in FIGS. 1-4, the slickline lubrication device 100 may comprise a contaminant housing 102 and a solvent housing 120. As shown in FIGS. 2-4, the slickline lubrication device 100 may further comprise a first plate 140 between the contaminant housing 102 and the solvent housing 120, a first sealing element 150 in the first plate, and a second sealing element 170 distal to the first sealing element.

In embodiments, the contaminant housing 102, the solvent housing 120, or both have an inner diameter of from 3.5 inches to 4 inches and an outer diameter of from 4 inches to 4.5 inches.

Still referring to FIGS. 2-4, the contaminant housing 102 may comprise a solvent housing coupling end 104, a first end 106, and at least one contaminant housing sidewall 110 extending from the solvent housing coupling end 104 to the first end 106. The first end 106 may comprise a first end opening 108 sized to accept the slickline cable 210.

The solvent housing 120 may comprise a second end 124, a contaminant housing coupling end 122, and at least one solvent housing sidewall 128 extending from the second end 124 to the contaminant housing coupling end 122. The second end 124 may comprise a second end opening 126 sized to accept the slickline cable 210.

The solvent housing 120 may also be coupled to the contaminant housing 102, such as being removably coupled to the contaminant housing 102. The solvent housing 120 may be coupled or removably coupled to the contaminant housing 102 in any manner understood in the art, including but not limited to flange-type connectors, threaded connectors, adhesive connectors, magnetic connectors, or combinations thereof. For example, and as illustrated in FIGS. 2-4, the contaminant housing 102 may comprise a male threaded connector on the solvent housing coupling end 104, with the solvent housing 120 comprising a paired female connector on the contaminant housing coupling end 122. Similarly, the contaminant housing 102 may comprise the paired female connector, and the solvent housing 120 may include the male threaded connector.

Still referring to FIGS. 2-4, and as previously stated, the slickline lubrication device 100 may further comprise the first plate 140. In embodiments, the first plate 140 may comprise an identical or different material to the contaminant housing 102 and the solvent housing 120. The first plate 140 may be positioned proximal the contaminant housing coupling end 122 or the solvent housing coupling end 104. The first plate 140 may also be monolithic with the contaminant housing coupling end 122 or the solvent housing coupling end 104. The first plate 140 may also have a first plate opening 142 sized to accept the slickline cable 210.

Still referring to FIGS. 2-4, the slickline lubrication device 100 may further comprise a second plate 160. The second plate 160 may be similar or identical to the first plate 140. The second plate 160 may be positioned proximal the second end 124 of the solvent housing 120, and may additionally be monolithic with the second end 124.

As previously stated, the slickline lubrication device 100 may also comprise the first sealing element 150 and the second sealing element 170. The sealing elements described herein may be an elastomer, such as but not limited to, rubber or polyurethane. In embodiments, the sealing elements used herein may be O-rings or equivalents thereof. The first sealing element 150 may be positioned within the contaminant housing 102, the first plate 140, or both. The first sealing element 150 may also comprise a first sealing element opening 152 sized to accept the slickline cable 210. The second sealing element 170 may be positioned within the solvent housing 120 proximal the second end 124, may be positioned within the second plate 160, or both. The second sealing element 170 may also comprise a second sealing element opening 162 sized to accept the slickline cable 210.

In embodiments, the first sealing element 150 may be configured to accept and wipe the exterior of the slickline cable 210 when the slickline cable 210 translates from the first end 106 to the second end 124. Without being limited by theory, the wiping of the slickline cable 210 in such a manner may operate to remove contaminants from the slickline cable 210 when the slickline cable 210 is retrieved from the wellbore 290. Similarly, the second sealing element 170 may be configured to accept and wipe the exterior of the slickline cable 210 when the slickline cable 210 translates from the first end 106 to the second end 124. Without being limited by theory, the wiping of the slickline cable 210 in such a manner may operate to remove excess lubricant from the slickline cable 210 before the slickline is spooled on the slickline spool, such as within the slickline truck 300.

Figure 5:
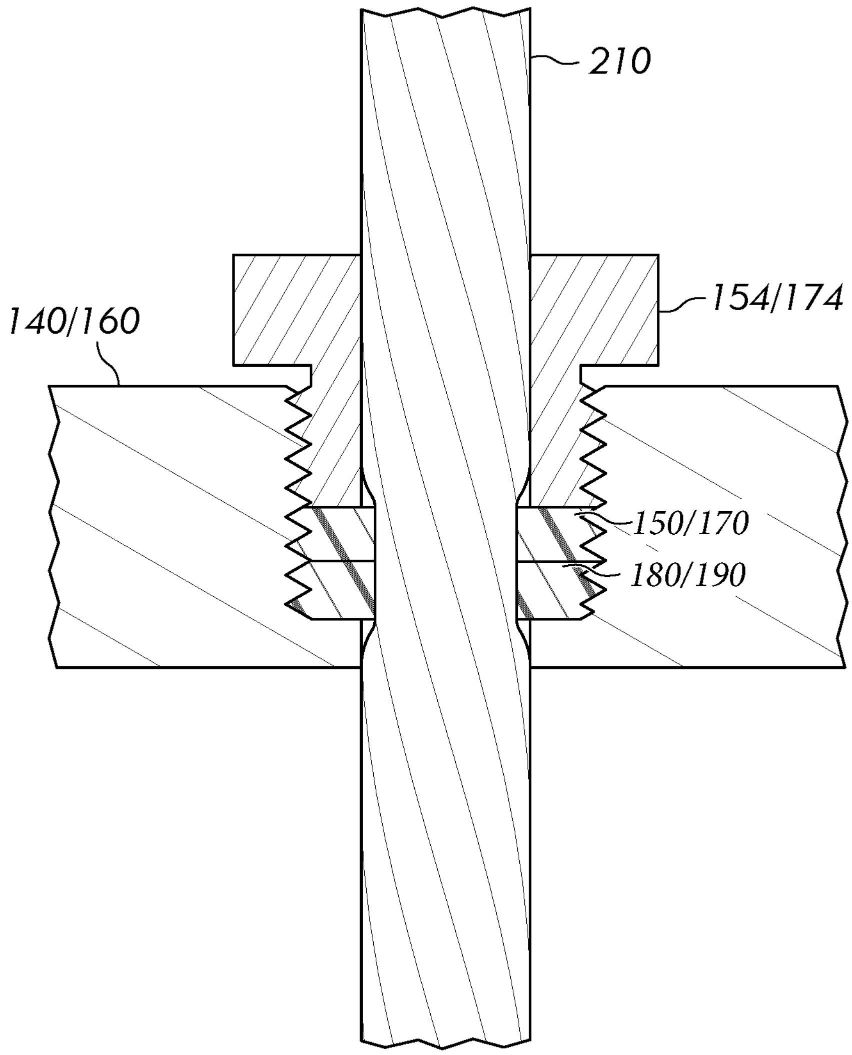
FIG. 5 illustrates a 'zoomed-in' cross-sectional view of the first plate or second plate of the slickline lubrication device of FIGS. 1-3, according to one or more embodiments herein.

In some embodiments, and as shown in FIG. 5, the slickline lubrication device 100 may further comprise a third sealing element 180 positioned below the first sealing element 150. The third sealing element 180 may be configured to accept and wipe the exterior of the slickline cable 210 when the slickline cable 210 translates from the second end 124 to the first end 106. Without being limited by theory, the wiping of the slickline cable 210 in such a manner may operate to remove excess lubricant from the slickline cable 210 before the slickline enters the contaminant housing 102. However, in some embodiments, the first sealing element 150 may be configured to wipe the exterior of the slickline cable 210 when the slickline cable 210 translates from either the second end 124 to the first end 106 or from the first end 106 to the second end 124.

In some embodiments, and as also shown in FIG. 5, the slickline lubrication device 100 may further comprise a fourth sealing element 190 positioned below the second sealing element 170. The fourth sealing element 190 may be configured to accept and wipe the exterior of the slickline cable 210 when the slickline cable 210 translates from the second end 124 to the first end 106. Without being limited by theory, the wiping of the slickline cable 210 in such a manner may operate to remove contaminants adhered to the slickline cable 210 during translation from the slickline spool within the slickline truck 300 to the second end opening 126. However, in some embodiments, the second sealing element 170 may be configured to wipe the exterior of the slickline cable 210 when the slickline cable 210 translates from either the second end 124 to the first end 106 or from the first end 106 to the second end 124.

Referring to FIG. 5, illustrated is a 'zoomed-in' cross-sectional view of the first plate 140 or the second plate 160. As shown in FIG. 5, the first sealing element 150 and the second sealing element 170 may also be sized or configured to compress the slickline cable 210 as the slickline cable 210 translates through the sealing element, increasing the amount of contaminants or excess lubricant removed from the exterior of the slickline cable 210.

Referring back to FIGS. 2-4, in embodiments, the first plate 140 opening may comprise a first plurality of female threads 144 and a first ledge 146 extending radially inward from the first plate 140 opening. The first ledge 146 may be sized to receive the slickline cable 210 and the first plurality of female threads 144 may be sized to receive the first sealing element 150, the third sealing element 180, or both. The first ledge 146 may also be positioned below the first plurality of female threads 144, such that the first sealing element 150 and the third sealing element 180 cannot pass through the first ledge 146.

Still referring to FIGS. 2-4, the slickline lubrication device 100 may further comprise a first packing nut 154 having a first plurality of male threads 156 and a first aperture 158 sized to receive the slickline cable 210. The first packing nut 154 may be positioned above the first sealing element 150, and the first plurality of male threads 156 may be sized to mate to the first plurality of female threads 144 (and vice versa).

Similarly, the second plate 160 opening or the second end opening 126 may comprise a second plurality of female threads 164 and a second ledge 166 extending radially inward from the second plate 160 opening or second end opening 126, respectively. The second ledge 166 may be sized to receive the slickline cable 210 and the second plurality of female threads 164 may be sized to receive the second sealing element 170, the fourth sealing element 190, or both. The second ledge 166 may also be positioned below the second plurality of female threads 164, such that the second sealing element 170 and the fourth sealing element 190 cannot pass through the second ledge 166.

Still referring to FIGS. 2-4, the slickline lubrication device 100 may further comprise a second packing nut 174 having a second plurality of male threads 176 and a second aperture 178 sized to receive the slickline cable 210. The second packing nut 174 may be positioned above the second sealing element 170, and the second plurality of male threads 176 may be sized to mate to the first plurality of female threads 144 (and vice versa).

Still referring to FIGS. 2-4, the contaminant housing 102 may also comprise a contaminant housing drain valve 112 positioned above the first sealing element 150 in the first plate 140. The contaminant housing drain valve 112 may be configured to drain contaminants from the contaminant housing 102, such as by gravity drainage. The contaminant housing 102 may also comprise a contaminant housing purge valve 114 positioned above the first sealing element 150, the contaminant housing drain valve 112, or both. The contaminant housing purge valve 114 may be configured to provide a purge fluid to the contaminant housing 102. As previously stated, the contaminants may include but may not be limited to wellbore fluids, dirt, and grime, as well as excess grease from the lubricator 230.

The solvent housing 120 may also comprise a solvent housing drain valve 130 positioned above the second sealing element 170. The solvent housing drain valve 130 may be configured to drain solvent from the solvent housing 120, such as by gravity drainage. The solvent housing 120 may also comprise a solvent housing inlet valve 132 positioned above the second sealing element 170, the solvent housing drain valve 130, or both. The solvent housing inlet valve 132 may be configured to provide additional solvent to the solvent housing 120. Without being limited by theory, the combination of the solvent housing inlet valve 132 and the solvent housing drain valve 130 may operate to allow the purging of the solvent housing 120 in the event of contamination of the solvent without needing to remove the slickline lubrication device 100 from the slickline cable 210. In embodiments, the solvent may be a degreaser (such as CC02B Industrial Degreaser), an oil (such as a penetrating mineral oil), or combinations thereof, although other solvents are contemplated.

As previously stated, and as shown in FIG. 1, the slickline lubrication device 100 may be removably coupled to the joint 260. In embodiments, the joint 260 may be removably coupled to the contaminant housing 102, the solvent housing 120, or both of the slickline lubrication device 100.

Now referring to FIGS. 1-5, and as previously stated, embodiments herein may also be directed to methods of conducting slickline operations in a well utilizing the slickline lubrication device 100. The method may initially comprise providing a system 200 for slickline lubrication, which may be any of the systems 200 previously discussed, and may comprise any of the slickline lubrication devices 100 previously discussed.

The method may further comprise feeding the slickline cable 210 through the wellhead 280, thereby exposing the exterior of the slickline cable 210 to solvent in the solvent chamber. The method may also comprise feeding the slickline cable 210 through the wellbore 290, thereby exposing an exterior of the slickline cable 210 to wellbore 290 fluids. The method may also comprise retrieving the slickline cable 210 from the wellbore 290, thereby removing the wellbore 290 fluids from an exterior of the slickline cable 210 utilizing the first sealing element 150 and subsequently exposing the slickline cable 210 to the solvent in the solvent housing 120.

It is also noted that recitations herein of "one or more" components, elements, etc., should not be used to create an inference that the alternative use of the articles "a" or "an" should be limited to a single component, element, etc. For example, a sealing element may mean one sealing element, two sealing elements, three sealing elements, and so on.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the term "having" in this disclosure should also be interpreted in like manner as the more commonly used open-ended preamble term "comprising".

What is claimed is:

1. A slickline lubrication device comprising:

a contaminant housing comprising a solvent housing coupling end, a first end, and at least one contaminant housing sidewall extending from the solvent housing coupling end to the first end, wherein the first end comprises a first end opening sized to accept a slickline cable;

a solvent housing comprising a second end, a contaminant housing coupling end, and at least one solvent housing sidewall extending from the second end to the contaminant housing coupling end, wherein the second end comprises a second end opening sized to accept the slickline cable, and wherein the solvent housing is coupled to the contaminant housing;

a first plate comprising a first plate opening sized to accept the slickline cable, the first plate positioned proximal the contaminant housing coupling end or the solvent housing coupling end;

a first sealing element comprising a first sealing element opening that is sized to accept the slickline cable, wherein the first sealing element is positioned within the contaminant housing, the plate, or both;

a second sealing element comprising a second sealing element opening that is sized to accept the slickline cable, wherein the second sealing element is positioned within the solvent housing; and a packing nut comprising a plurality of male threads and an aperture sized to receive the slickline cable, wherein the plate opening, the second end opening, or both comprise a plurality of female threads and a ledge extending radially inward from the plate opening or the second end opening respectively, the ledge is sized to receive the slickline cable, the plurality of female threads of the plate opening are sized to receive the first sealing element and mate to the plurality of male threads of the packing nut, and the plurality of female threads of the second end opening are sized to receive the second sealing element and mate to the plurality of male threads of the packing nut.

2. The device of claim 1, wherein:

the contaminant housing further comprises a third sealing element positioned below the first sealing element and a fourth sealing element positioned below the second sealing element;

the third sealing element and the fourth sealing element are both configured to accept the slickline cable;

the first sealing element and the second sealing element are both configured to wipe an exterior of the slickline cable when the slickline cable proceeds from the first end to the second end; and the third sealing element and the fourth sealing element are both configured to wipe the exterior of the slickline cable when the slickline cable proceeds from the second end to the first end.

3. The device of claim 1, wherein:

the first sealing element is configured to wipe the exterior of the slickline cable when the slickline cable proceeds from either the first end to the second end or the second end to the first end; and the second sealing element is configured to wipe the exterior of the slickline cable when the slickline cable proceeds from either the first end to the second end or the second end to the first end.

4. The device of claim 1, further comprising a second packing nut comprising a second plurality of male threads and a second aperture sized to receive the slickline cable, wherein:

the plate opening comprises the plurality of female threads and the ledge;

the second end opening further comprises a second plate comprising a second plate opening sized to accept the slickline cable;

the second plate is positioned proximal the second end opening; and the second plurality of female threads and the second ledge are positioned within the second plate; and the second plurality of female threads are sized to receive the second sealing element and mate to the second plurality of male threads.

5. The device of claim 1, wherein:

the contaminant housing, the solvent housing, or both have an inner diameter of from 3.5 inches to 4 inches; and the contaminant housing, the solvent housing, or both have an outer diameter of from 4 inches to 4.5 inches.

6. The device of claim 1, wherein:

the contaminant housing further comprises:

a contaminant housing drain valve positioned above the first sealing element, the contaminant housing drain valve configured to drain contaminants from the contaminant housing, a contaminant housing purge valve positioned above the first sealing element, the contaminant housing purge valve configured to provide a purge fluid to the contaminant housing, or both;

the solvent housing further comprises:

a solvent housing drain valve positioned above the second sealing element, the solvent housing drain valve configured to drain a solvent from the solvent housing, a solvent housing inlet valve positioned above the second sealing element, the solvent housing inlet valve configured to provide the solvent to the solvent housing, or both; or both.

7. The device of claim 1, wherein the first plate is monolithic with the contaminant housing coupling end, the solvent housing coupling end, or both.

8. A system for slickline lubrication utilizing the slickline lubrication device of claim 1, the system comprising:

a pressure control apparatus fluidly coupled to a well casing, wherein the pressure control apparatus is a blow-out preventer (BOP) or a christmas tree;

a lubricator positioned above and fluidly connected to the pressure control apparatus;

a stuffing box positioned above and fluidly connected to the lubricator;

a stuffing box sheave positioned above the stuffing box;

the slickline lubrication device of claim 1, the slickline lubrication device positioned below the stuffing box sheave and offset from the lubricator;

a joint removably coupling the stuffing box, the lubricator, or both to the slickline lubrication device;

a hay pulley positioned below the slickline lubrication device; and a slickline cable extending along the hay pulley and the stuffing box sheave, and extending within the slickline lubrication device, the stuffing box, and the lubricator.

9. The system of claim 8, wherein the joint is a ball-joint.

10. A method of conducting slickline operations in a well utilizing the slickline lubrication device of claim 1, the method comprising:

providing a system for slickline lubrication comprising a pressure control apparatus fluidly coupled to a well casing, wherein the pressure control apparatus is a blow-out preventer (BOP) or a christmas tree, a lubricator positioned above and fluidly connected to the pressure control apparatus, a stuffing box positioned above and fluidly connected to the lubricator, the slickline lubrication device of claim 1, a slickline cable extending within the slickline lubrication device, the stuffing box, and the lubricator, feeding the slickline cable through the slickline lubrication device, thereby exposing an exterior of the slickline cable to a solvent in the solvent housing;

feeding the slickline cable through the wellbore, thereby exposing an exterior of the slickline cable to wellbore fluids; and retrieving the slickline cable from the wellbore, thereby removing the wellbore fluids from an exterior of the slickline cable utilizing the first sealing element and subsequently exposing the slickline cable to the solvent in the solvent housing.

11. The method of claim 10, wherein the solvent is a degreaser, an oil, or combinations thereof.

12. A slickline lubrication device comprising:

a contaminant housing comprising a solvent housing coupling end, a first end, and at least one contaminant housing sidewall extending from the solvent housing coupling end to the first end, wherein the first end comprises a first end opening sized to accept a slickline cable;

a solvent housing comprising a second end, a contaminant housing coupling end, and at least one solvent housing sidewall extending from the second end to the contaminant housing coupling end, wherein the second end comprises a second end opening sized to accept the slickline cable, and wherein the solvent housing is coupled to the contaminant housing;

a first plate comprising a first plate opening sized to accept the slickline cable, the first plate positioned proximal the contaminant housing coupling end or the solvent housing coupling end;

a first sealing element comprising a first sealing element opening that is sized to accept the slickline cable, wherein the first sealing element is positioned within the contaminant housing, the plate, or both;

a second sealing element comprising a second sealing element opening that is sized to accept the slickline cable, wherein the second sealing element is positioned within the solvent housing, and wherein the first plate is monolithic with the contaminant housing coupling end, the solvent housing coupling end, or both.

13. The device of claim 12, further comprising a packing nut comprising a plurality of male threads and an aperture sized to receive the slickline cable, wherein:

the plate opening, the second end opening, or both comprise a plurality of female threads and a ledge extending radially inward from the plate opening or the second end opening respectively;

the ledge is sized to receive the slickline cable;

the plurality of female threads of the plate opening are sized to receive the first sealing element and mate to the plurality of male threads; and the plurality of female threads of the second end opening are sized to receive the second sealing element and mate to the plurality of male threads.

14. The device of claim 12, wherein:

the contaminant housing further comprises a third sealing element positioned below the first sealing element and a fourth sealing element positioned below the second sealing element;

the third sealing element and the fourth sealing element are both configured to accept the slickline cable;

the first sealing element and the second sealing element are both configured to wipe an exterior of the slickline cable when the slickline cable proceeds from the first end to the second end; and the third sealing element and the fourth sealing element are both configured to wipe the exterior of the slickline cable when the slickline cable proceeds from the second end to the first end.

15. The device of claim 12, wherein:

the first sealing element is configured to wipe the exterior of the slickline cable when the slickline cable proceeds from either the first end to the second end or the second end to the first end; and the second sealing element is configured to wipe the exterior of the slickline cable when the slickline cable proceeds from either the first end to the second end or the second end to the first end.

16. The device of claim 13, further comprising a second packing nut comprising a second plurality of male threads and a second aperture sized to receive the slickline cable, wherein:

the plate opening comprises the plurality of female threads and the ledge;

the second end opening further comprises a second plate comprising a second plate opening sized to accept the slickline cable;

the second plate is positioned proximal the second end opening; and the second plurality of female threads and the second ledge are positioned within the second plate; and the second plurality of female threads are sized to receive the second sealing element and mate to the second plurality of male threads.

17. The device of claim 12, wherein:

the contaminant housing further comprises:

a contaminant housing drain valve positioned above the first sealing element, the contaminant housing drain valve configured to drain contaminants from the contaminant housing, a contaminant housing purge valve positioned above the first sealing element, the contaminant housing purge valve configured to provide a purge fluid to the contaminant housing, or both;

the solvent housing further comprises:

a solvent housing drain valve positioned above the second sealing element, the solvent housing drain valve configured to drain a solvent from the solvent housing, a solvent housing inlet valve positioned above the second sealing element, the solvent housing inlet valve configured to provide the solvent to the solvent housing, or both; or both.

18. A system for slickline lubrication utilizing the slickline lubrication device of claim 12, the system comprising:

a pressure control apparatus fluidly coupled to a well casing, wherein the pressure control apparatus is a blow-out preventer (BOP) or a christmas tree;

a lubricator positioned above and fluidly connected to the pressure control apparatus;

a stuffing box positioned above and fluidly connected to the lubricator;

a stuffing box sheave positioned above the stuffing box;

the slickline lubrication device positioned below the stuffing box sheave and offset from the lubricator;

a joint removably coupling the stuffing box, the lubricator, or both to the slickline lubrication device;

a hay pulley positioned below the slickline lubrication device; and a slickline cable extending along the hay pulley and the stuffing box sheave, and extending within the slickline lubrication device, the stuffing box, and the lubricator.

19. A system for slickline lubrication, the system comprising:

a pressure control apparatus fluidly coupled to a well casing, wherein the pressure control apparatus is a blow-out preventer (BOP) or a christmas tree;

a lubricator positioned above and fluidly connected to the pressure control apparatus;

a stuffing box positioned above and fluidly connected to the lubricator;

a stuffing box sheave positioned above the stuffing box;

a slickline lubrication device, the slickline lubrication device positioned below the stuffing box sheave and offset from the lubricator;

a ball-joint removably coupling the stuffing box, the lubricator, or both to the slickline lubrication device;

a hay pulley positioned below the slickline lubrication device; and a slickline cable extending along the hay pulley and the stuffing box sheave, and extending within the slickline lubrication device, the stuffing box, and the lubricator, wherein the slickline lubrication device comprises:

a contaminant housing comprising a solvent housing coupling end, a first end, and at least one contaminant housing sidewall extending from the solvent housing coupling end to the first end, wherein the first end comprises a first end opening sized to accept a slickline cable, a solvent housing comprising a second end, a contaminant housing coupling end, and at least one solvent housing sidewall extending from the second end to the contaminant housing coupling end, wherein the second end comprises a second end opening sized to accept the slickline cable, and wherein the solvent housing is coupled to the contaminant housing, a first plate comprising a first plate opening sized to accept the slickline cable, the first plate positioned proximal the contaminant housing coupling end or the solvent housing coupling end, a first sealing element comprising a first sealing element opening that is sized to accept the slickline cable, wherein the first sealing element is positioned within the contaminant housing, the plate, or both, and a second sealing element comprising a second sealing element opening that is sized to accept the slickline cable, wherein the second sealing element is positioned within the solvent housing.

20. The system of claim 19, wherein the slickline lubrication device further comprises a packing nut comprising a plurality of male threads and an aperture sized to receive the slickline cable, wherein:

the plate opening, the second end opening, or both comprise a plurality of female threads and a ledge extending radially inward from the plate opening or the second end opening respectively;

the ledge is sized to receive the slickline cable;

the plurality of female threads of the plate opening are sized to receive the first sealing element and mate to the plurality of male threads; and the plurality of female threads of the second end opening are sized to receive the second sealing element and mate to the plurality of male threads.

21. The system of claim 19, wherein:

the contaminant housing further comprises a third sealing element positioned below the first sealing element and a fourth sealing element positioned below the second sealing element;

the third sealing element and the fourth sealing element are both configured to accept the slickline cable;

the first sealing element and the second sealing element are both configured to wipe an exterior of the slickline cable when the slickline cable proceeds from the first end to the second end; and the third sealing element and the fourth sealing element are both configured to wipe the exterior of the slickline cable when the slickline cable proceeds from the second end to the first end.

22. The system of claim 19, wherein:

the first sealing element is configured to wipe the exterior of the slickline cable when the slickline cable proceeds from either the first end to the second end or the second end to the first end; and the second sealing element is configured to wipe the exterior of the slickline cable when the slickline cable proceeds from either the first end to the second end or the second end to the first end.

23. The system of claim 20, wherein the slickline lubrication device further comprises a second packing nut comprising a second plurality of male threads and a second aperture sized to receive the slickline cable, wherein:

the plate opening comprises the plurality of female threads and the ledge;

the second end opening further comprises a second plate comprising a second plate opening sized to accept the slickline cable;

the second plate is positioned proximal the second end opening; and the second plurality of female threads and the second ledge are positioned within the second plate; and the second plurality of female threads are sized to receive the second sealing element and mate to the second plurality of male threads.

24. The system of claim 19, wherein:

the contaminant housing further comprises:

a contaminant housing drain valve positioned above the first sealing element, the contaminant housing drain valve configured to drain contaminants from the contaminant housing, a contaminant housing purge valve positioned above the first sealing element, the contaminant housing purge valve configured to provide a purge fluid to the contaminant housing, or both;

the solvent housing further comprises:

a solvent housing drain valve positioned above the second sealing element, the solvent housing drain valve configured to drain a solvent from the solvent housing, a solvent housing inlet valve positioned above the second sealing element, the solvent housing inlet valve configured to provide the solvent to the solvent housing, or both; or both.

25. The system of claim 19, wherein the first plate is monolithic with the contaminant housing coupling end, the solvent housing coupling end, or both.

* * * * *